United States Patent
Yuasa (10) Patent No.: US 10,246,872 B2
(45) Date of Patent: Apr. 2, 2019

(54) DWELLING WALL PROVIDED WITH VACUUM HEAT-INSULATING MATERIAL AND VACUUM HEAT-INSULATING MATERIAL

(71) Applicant: Panasonic Intellectual Property Management Co., Ltd., Osaka (JP)

(72) Inventor: Akiko Yuasa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/504,221

(22) PCT Filed: Dec. 22, 2015

(86) PCT No.: PCT/JP2015/006386
§ 371 (c)(1),
(2) Date: Feb. 15, 2017

(87) PCT Pub. No.: WO2016/103679
PCT Pub. Date: Jun. 30, 2016

(65) Prior Publication Data
US 2017/0234005 A1    Aug. 17, 2017

(30) Foreign Application Priority Data

Dec. 26, 2014   (JP) ................................ 2014-265936

(51) Int. Cl.
*E04B 2/26*    (2006.01)
*E04B 1/70*    (2006.01)
(Continued)

(52) U.S. Cl.
CPC ............. *E04B 2/26* (2013.01); *E04B 1/7038* (2013.01); *E04B 1/803* (2013.01); *E04B 2/02* (2013.01); *F16L 59/065* (2013.01)

(58) Field of Classification Search
CPC ............. E04B 2/26; E04B 2/02; E04B 1/7038
See application file for complete search history.

(56) References Cited

U.S. PATENT DOCUMENTS 2,141,821 A * 12/1938 Pemberton ............. E04F 13/04
   52/342
2,677,938 A *  5/1954 Loveday ............... F17C 13/083
   220/560.12
(Continued)

FOREIGN PATENT DOCUMENTS

CN    203525724 U  *  4/2014
JP    11-106539 A      4/1999
(Continued)

OTHER PUBLICATIONS

International Search Report and Written Opinion dated Feb. 16, 2016, issued in International Application No. PCT/JP2015/006386. (w/ partial English translation).
(Continued)

*Primary Examiner* — Jeanette E Chapman
(74) *Attorney, Agent, or Firm* — McDermott Will & Emery LLP (57) ABSTRACT

A dwelling wall includes: a vacuum heat-insulating material including an outer cover material, and an inner member which is sealed in a tightly closed and decompressed state on the inside of the outer cover material; and a wall material. In addition, the vacuum heat-insulating material is disposed on a rear surface side of the wall material, and the inner member is configured of a material which does not generate hydrogen in a case of coming into contact with moisture of liquid. According to the configuration, even in a case where the vacuum heat-insulating material used in the dwelling wall is ruptured and water of liquid comes into contact with the inner member, it is possible to realize excellent stability of the dwelling wall.

9 Claims, 1 Drawing Sheet (51) Int. Cl.
*E04B 2/02* (2006.01)
*E04B 1/80* (2006.01)
*F16L 59/06* (2006.01)
*F16L 59/065* (2006.01)

(56) References Cited

U.S. PATENT DOCUMENTS

| | | | | |
|---|---|---|---|---|
| 3,264,165 | A * | 8/1966 | Stickel | E04B 1/80 |
| | | | | 220/560.01 |
| 5,693,399 | A * | 12/1997 | Himeshima | F16L 59/065 |
| | | | | 428/69 |
| 6,164,030 | A * | 12/2000 | Dietrich | F16L 59/12 |
| | | | | 52/406.2 |
| 7,866,105 | B2 * | 1/2011 | Babbitt | B32B 5/02 |
| | | | | 52/309.1 |
| 8,864,885 | B2 * | 10/2014 | Yuasa | B01J 20/28033 |
| | | | | 252/194 |
| 2008/0245676 | A1 * | 10/2008 | McManus | B65D 7/045 |
| | | | | 206/0.7 |
| 2013/0160652 | A1 * | 6/2013 | Yuasa | B01D 53/261 |
| | | | | 96/153 |
| 2013/0291733 | A1 * | 11/2013 | Koshiyama | F16L 59/065 |
| | | | | 96/108 |
| 2014/0178626 | A1 * | 6/2014 | Min | F16L 59/065 |
| | | | | 428/69 |
| 2014/0366480 | A1 | 12/2014 | Smith | |
| 2015/0344273 | A1 * | 12/2015 | Kalkman | B63B 27/10 |
| | | | | 212/308 |
| 2016/0069505 | A1 | 3/2016 | Yuasa | |

FOREIGN PATENT DOCUMENTS

| | | |
|---|---|---|
| JP | 2009-168092 A | 7/2009 |
| JP | 2010-060045 A | 3/2010 |
| JP | 2010-071303 A | 4/2010 |
| JP | 2012-021288 A | 2/2012 |
| JP | 5194812 B2 | 5/2013 |
| JP | 2014109334 A * | 6/2014 |
| JP | 2014-214959 A | 11/2014 |
| JP | 2014-218851 A | 11/2014 |
| WO | 2014/174837 A1 | 10/2014 |

OTHER PUBLICATIONS

Chinese Search Report dated Jun. 25, 2018 for the related Chinese Patent Application No. 201580044593.4.
The Extended European Search Report dated Dec. 1, 2017 for the related European Patent Application No. 15872250.4.

* cited by examiner

DWELLING WALL PROVIDED WITH VACUUM HEAT-INSULATING MATERIAL AND VACUUM HEAT-INSULATING MATERIAL

RELATED APPLICATIONS

This application is a U.S. national stage application of the PCT International Application No. PCT/JP2015/006386 filed on Dec. 22, 2015, which claims the benefit of foreign priority of Japanese patent application 2014-265936 filed on Dec. 26, 2014, the contents all of which are incorporated herein by reference.

TECHNICAL FIELD

The present invention relates to a dwelling wall provided with a vacuum heat-insulating material and a vacuum heat-insulating material used in a dwelling wall.

BACKGROUND ART

In recent years, from the viewpoint of suppressing global warming, both energy saving in household electric appliance and industrial equipment and reduction of energy caused by dwelling are important problems to be addressed. Since influence of a cooling and heating operation is large as energy consumption caused by dwelling, improvement of heat-insulation of a dwelling building is an important solution. Therefore, various heat-insulating walls are suggested. An example of a high-performance heat-insulating material used in the heat-insulating wall includes a vacuum heat-insulating material. A general vacuum heat-insulating material has a configuration in which a core material or the like is sealed in a tightly closed and decompressed state, on the inside of a bag-like outer cover material having gas barrier characteristics. For example, in PTL 1, a configuration in which a heat-insulating panel having a vacuum heat-insulating material is used as a construction member that can be used as a wall of a building, is disclosed.

Here, since a dwelling wall is exposed to wind and rain, in the vacuum heat-insulating material used in the dwelling wall, necessity to assume that "water of liquid", such as rain water, enters the inside when an outer cover material is damaged (that is, when the vacuum heat-insulating material is ruptured), has become apparent by investigation of the inventors.

However, in the dwelling wall which uses the vacuum heat-insulating material of the related art, when the vacuum heat-insulating material is ruptured, influence on a chemical reaction between an inner member and moisture is not considered.

CITATION LIST

Patent Literature

PTL 1: Japanese Patent Unexamined Publication No. 2012-21288

SUMMARY OF THE INVENTION

In the present invention, considering the problem, even in a case where a vacuum heat-insulating material used in a dwelling wall is ruptured and water of liquid comes into contact with an inner member, excellent stability of a dwelling wall is realized.

A dwelling wall including: a vacuum heat-insulating material including an outer cover material, and an inner member which is sealed in a tightly closed and decompressed state on the inside of the outer cover material; and a wall material. In addition, the vacuum heat-insulating material is disposed on a rear surface side of the wall material, and the inner member is configured of a material which does not generate hydrogen in a case of coming into contact with moisture of liquid.

In addition, a vacuum heat-insulating material according to the present invention is used in a dwelling wall provided with a wall material and is disposed on a rear surface side of the wall material. In addition, the vacuum heat-insulating material includes an outer cover material; and an inner member which is sealed in a tightly closed and decompressed state on the inside of the outer cover material. Furthermore, the inner member is configured of a material which does not generate hydrogen in a case of coming into contact with moisture of liquid.

According to the configuration, hydrogen generation which is assumed not to be preferable as influence on stability of the dwelling wall is considered, and when the inner member of the vacuum heat-insulating material and the moisture react to each other, by suppressing a possibility of the worst situation caused by the hydrogen generation, it is possible to substantially improve reliability of the dwelling wall provided with the vacuum heat-insulating material.

According to the present invention, even in a case where the vacuum heat-insulating material used in the dwelling wall is ruptured and the water of the liquid comes into contact with the inner member, it is possible to realize excellent stability of the dwelling wall.

DESCRIPTION OF EMBODIMENT

Hereinafter, preferable exemplary embodiments of the present invention will be described with reference to the drawings. In addition, in the following examples, the same elements and corresponding elements are given the same reference numerals through all of the drawings, and overlapping description thereof will be omitted.

[Dwelling Wall]

Figure 1:
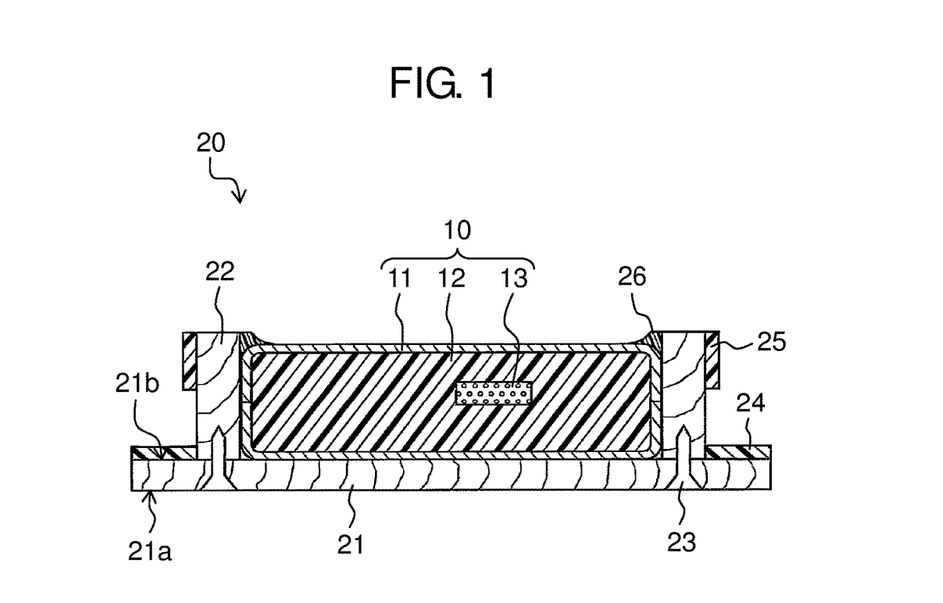
FIG. 1 is a schematic sectional view illustrating an example of a configuration of a dwelling wall according to an exemplary embodiment of the present invention.

As illustrated in FIG. 1, a dwelling wall 20 according to the exemplary embodiment includes a wall material 21, a frame body 22, and a vacuum heat-insulating material 10. When the wall material 21 is provided as a wall of a building, the wall material 21 is a wall which has proof stress which withstands a force from the perpendicular direction and the horizontal direction, and can support the building. A specific configuration thereof is not particularly limited, and a known configuration can be appropriately used. In FIG. 1, for convenience of description, one plate member is illustrated, but the wall material 21 may be a panel configured of a stud, a bracing member, or a plywood material.

A front surface 21a of the wall material 21 becomes a wall surface of the building, but the vacuum heat-insulating material 10 is fixed to a rear surface 21b of the wall material 21. Therefore, the dwelling wall 20 according to the exemplary embodiment is configured of a heat-insulating panel material in which the wall material 21 and the vacuum heat-insulating material 10 are integrated.

The frame body 22 supports the vacuum heat-insulating material 10 by fixing the vacuum heat-insulating material 10 to the rear surface 21b of the wall material 21. In addition, the frame body 22 may have a function of reinforcing the proof stress of the wall material 21. The frame body 22 is fixed to the wall material 21 by a nail member 23 inserted from the front surface 21a of the wall material 21. In addition, the vacuum heat-insulating material 10 is disposed in a frame of the frame body 22, and a void between the frame body 22 and the vacuum heat-insulating material 10 is buried by a calking material 26.

Furthermore, on the rear surface 21b of the wall material 21, a part exposed to the outside of the frame body 22 is provided, and on an outer circumferential surface of the frame body 22, airtight materials 24 and 25 are provided. The airtight materials 24 and 25 function for airtightly holding a space between a column or a beam and the dwelling wall 20 when the dwelling wall 20 which is made as a panel is attached and fixed to the column or the beam of the building. A specific configuration of the airtight materials 24 and 25 and the calking material 26 is not particularly limited, and a known configuration can be appropriately used.

In this manner, since the dwelling wall 20 according to the exemplary embodiment is fixed in a state where the vacuum heat-insulating material 10 overlaps a large part of the wall material 21, it is possible to efficiently heat-insulate the entire wall body. However, since it is possible to suppress deterioration of the heat-insulating function over time, the heat-insulation is unlikely to deteriorate even when the vacuum heat-insulating material 10 is used as a wall of dwelling for a long period of time. Therefore, it is possible to appropriately use the vacuum heat-insulating material 10 as a wall or the like of energy saving dwelling of the next generation.

In addition, the dwelling wall 20 according to the exemplary embodiment may be configured in which the vacuum heat-insulating material 10 and the wall material 21 are provided, and the vacuum heat-insulating material 10 is disposed on the rear surface 21b side of the wall material 21, and for example, the frame body 22 or the like may not be provided. Furthermore, the dwelling wall 20 according to the exemplary embodiment configures the "heat-insulating panel material" which is made as a panel, but a specific configuration of the heat-insulating panel material is not limited to the configuration disclosed in the exemplary embodiment, and a configuration of a known heat-insulating panel material can be employed.

In addition, in the exemplary embodiment, the frame body 22 is fixed to the wall material 21 after making the dwelling wall 20 as a panel, but a fixing method of the frame body 22 is not limited to a method which uses the nail member 23. For example, the fixing method may be a method which uses a fixing member other than the nail member 23, or a method of configuring a recessed portion and a projected portion and combining and fixing the recessed portion and the projected portion to each of the wall material 21 and the frame body 22.

Furthermore, it is not necessary to make the dwelling wall 20 according to the exemplary embodiment as a panel as a necessary heat-insulating panel, and when the dwelling wall 20 is used as the wall of dwelling, the vacuum heat-insulating material 10 may be fixed to the rear surface 21b of the wall material 21. Therefore, when the dwelling is built, on the construction site, the dwelling wall 20 according to the exemplary embodiment can be assembled at any time.

[Vacuum Heat-Insulating Material]

Next, a representative example of the vacuum heat-insulating material used in the dwelling wall 20 will be specifically described with reference to FIG. 2.

Figure 2:
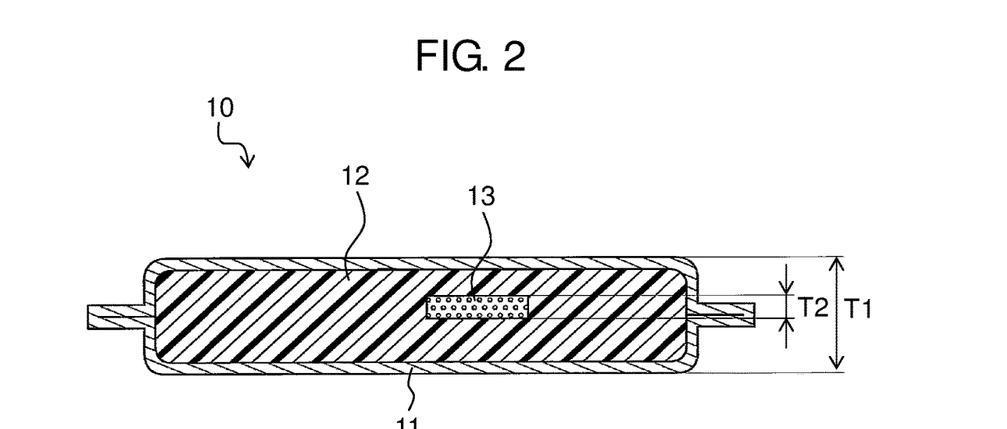
FIG. 2 is a schematic sectional view illustrating a configuration example of a vacuum heat-insulating material used in a dwelling wall illustrated in FIG. 1.

As illustrated in FIG. 2, a vacuum heat-insulating material 10 according to the exemplary embodiment includes an outer cover material 11 (outer package material), and an inner member which is sealed in a tightly closed and decompressed state (substantially vacuum state) on the inside of the outer cover material 11. When the outer cover material 11 is ruptured (damaged or the like) and the water of liquid enters the inside, in a case of coming into contact with the moisture, the inner member is configured of a material which does not cause a chemical reaction as hydrogen is generated. The vacuum heat-insulating material 10 according to the exemplary embodiment has a core material 12 and an adsorbent 13 as the inner member.

The outer cover material 11 is a bag-like member having gas barrier characteristics, and in the exemplary embodiment, for example, by making two layered sheets oppose each other and sealing the vicinity thereof, the shape of a bag is achieved. A location (sealing portion) sealed in the vicinity is in a state where the core material 12 does not exist on the inside thereof, and the layered sheets come into contact with each other, and is formed in a shape of a fin which extends toward an outer circumference from a main body of the vacuum heat-insulating material 10.

A specific configuration of the layered sheet is not particularly limited, but for example, a configuration in which three layers including a surface protection layer, a gas barrier layer, and a thermal welding layer are layered in order can be employed. More specifically, for example, as the front protection layer, a nylon film having a thickness of 35 µm is employed, as the gas barrier layer, an aluminum foil having a thickness of 7 µm is employed, and as the thermal welding layer, a low-density polyethylene film having a thickness of 50 µm is employed, but the configuration is not particularly limited thereto. In addition, as the outer cover material 11, in addition to the layered sheet, a known configuration can be employed as long as the configuration can achieve the gas barrier characteristics.

The core material 12 is not particularly limited as long as the material has heat-insulating performance. Specifically, a known material, such as a fiber material or a foam material, can be employed. For example, in the exemplary embodiment, an inorganic fiber is used as the core material 12. The inorganic fiber may be a fiber which is made of an inorganic material, and specifically, for example, a fiber which is selected from a glass fiber, a ceramic fiber, a slag fiber, and a rock wool fiber can be employed. In addition, since the core material 12 may be used being formed in a shape of a plate, in addition to the inorganic fibers, at least one of a known binder material and powder may be included. The materials contribute to improving properties, such as strength, uniformity, and rigidity of the core material 12.

As the core material 12, a known fiber may be used in addition to the inorganic fiber, but in the exemplary embodiment, for example, as the inorganic fiber, a glass fiber (a glass fiber having a relatively large fiber diameter) of which an average fiber diameter is within a range of 4 µm to 15 µm is used, and further, the glass fiber is fired and used. If the core material 12 is the inorganic fiber, even when the outer cover material 11 is ruptured and the water of the liquid comes into contact therewith, the chemical reaction according to the generation of hydrogen is not generated. This is because a bonding strength between elements is high, and the chemical reaction is unlikely to be generated even when being exposed to the moisture since element bond in glass is covalent bond.

In the core material 12, as long as the material is covalently bonded, not a hydrogen generation amount of each element which configures the material, but a hydrogen generation amount per 1 g of a final product (the material configured of various elements itself) may be less than 80 mL. A measuring method of the hydrogen generation amount per 1 g of, for example, glass fiber which corresponds to the main idea of the exemplary embodiment is a method of measuring the hydrogen generation amount of not the element which configures the glass fiber but the glass fiber itself, and the hydrogen generation amount measured by the measuring method may be less than 80 mL.

As described above, in the exemplary embodiment, in a case where the material which forms the inner member of the vacuum heat-insulating material 10 has the covalent bond (chemical bond generated as coatoms share electrons with each other), since the bonding strength is extremely high, it is appropriate to measure the reaction to the moisture in the final product which is called the core material or the adsorbent. Additionally, even when the material which forms the inner member has ion bond (chemical bond by electrostatic attraction between a cation having a positive charge and an anion having a negative charge), since the bonding strength between the elements is high, it is appropriate to measure the reaction to the moisture in the final product which is called the core material or the adsorbent.

Meanwhile, in a case where the material which forms the inner member has metallic bond, since the bonding strength is low, it is appropriate to measure the reaction between the metal element included in the final product itself (element before alloying) and the moisture. The metal element emits several electrons, and becomes the cation (metal atomic nucleus having a positive charge that exists at a lattice point of metal crystal) and a free electron (having a negative charge that widens in the entire crystal). A free electron moves around between the cations that are regularly arranged, and the bond obtained by combination by Coulomb force (electrostatic force, electrostatic attraction) that works therebetween.

In the exemplary embodiment, as described above, in a case where the reaction to the moisture is measured in accordance with the combined state of the materials, by configuring the core material 12 to make the hydrogen generation amount per 1 g less than 80 mL, it is possible to realize the vacuum heat-insulating material 10 having high reliability.

In addition, by using the inorganic fiber as the core material 12, it is also possible to reduce deterioration of a degree of vacuum since remaining gas is discharged from components of the core material 12 on the inside of the vacuum heat-insulating material 10. Furthermore, when the core material 12 is the inorganic material, since absorbency (hygroscopicity) of the core material 12 is low, it is possible to maintain the moisture amount on the inside of the vacuum heat-insulating material 10 to be low.

In addition, by firing the inorganic fiber, even in a case where the outer cover material 11 is ruptured, the core material 12 does not largely swell up, and it is possible to hold the shape as the vacuum heat-insulating material 10. Specifically, for example, when sealing the inorganic fiber as the core material 12 without firing, according to the condition, the swelling when the rupture is generated can become 3 to 10 times that before the rupture. Meanwhile, by forming the core material 12 by firing the inorganic fiber, it is possible to suppress expansion when the rupture is generated to be less than three times. Therefore, by performing the firing processing with respect to the inorganic fiber which becomes the core material 12, it is possible not only to avoid a concern about generation of hydrogen, but also to efficiently suppress the expansion when the rupture is generated, and to improve dimension stability (that is, shape holding properties of the dwelling wall 20) of the vacuum heat-insulating material 10.

Here, in the configuration in which "the dimension stability (shape holding properties) of the vacuum heat-insulating material 10 is high" in the exemplary embodiment, as long as the core material 12 is configured of a material which is the fiber member, and which does not use the binder containing an organic material, is employed, a case the thickness after a partial rupture is less than three times compared to the thickness of the vacuum heat-insulating material 10 before the rupture can be considered as a case where the firing processing is performed with respect to the core material 12. This is because it is necessary to perform plastic deformation by the firing after improving the shape holding properties since a restoring force acts only by compressing the core material 12.

In addition, a firing condition of the inorganic fiber is not particularly limited, and it is possible to appropriately use various known conditions. In addition, the firing of the inorganic fiber is preferable processing in the exemplary embodiment, but is not necessary processing.

In addition to the inorganic fiber, as a material which can be used as the core material 12, a thermosetting foam body can be employed. The thermosetting foam body may be formed by foaming a thermosetting resin or a resin composition (thermosetting resin composition) including the thermosetting resin by a known method. Specific examples of the thermosetting resin can include an epoxy resin, a phenol resin, an unsaturated polyester resin, a urea resin, a melamine resin, polyimide, and polyurethane, but the thermosetting resin is not particularly limited thereto. In addition, a foaming method is also not particularly limited, and foaming may be performed under a known condition by using a known foaming agent.

When the core material 12 is configured of the thermosetting foaming body, similar to the inorganic fiber, even when the outer cover material 11 is ruptured and comes into contact with the water of the liquid, a chemical reaction according to the hydrogen is not generated. In addition, since the thermosetting foaming body has more excellent formability than that of the inorganic fiber, it is possible to contribute to improving properties, such as a shape stability, strength, and rigidity of the core material 12. In addition, in addition to the inorganic fiber and the thermosetting foaming body, as a material which can be used as the core material 12, a known organic fiber (fiber made of an organic material) can be employed, but specific types thereof are not particularly limited.

Next, the adsorbent 13 adsorbs and removes the remaining gas (also including vapor) discharged from fine cavity or the like of the core material 12, and external gas (also including vapor) which slightly enters from the sealing portion or the like, after the core material 12 is tightly closed and decompressed on the inside of the outer cover material 11. Therefore, the adsorbent 13 may be configured to be capable of adsorbing gas (including vapor) on the inside of the outer cover material 11, but in the exemplary embodiment, as will be described later, the adsorbent 13 is configured of a material which does not cause hydrogen generation in a case of coming into contact with the moisture.

In addition, in the exemplary embodiment, as the inner member of the vacuum heat-insulating material 10, the core material 12 and the adsorbent 13 are employed, but as the inner member, members other than the core material 12 and the adsorbent 13 may be included. In this case, the other inner members may be configured of a material which does not cause hydrogen generation in a case of coming into contact with the moisture.

[Material which does not Generate Hydrogen in Case of Coming into Contact with Water]

Among the inner members of the vacuum heat-insulating material 10, a fiber material or a foaming material which is used as the core material 12 do not generally generate hydrogen in a case of coming into contact with the water. However, as the material used as the adsorbent 13, there is a case where a material which comes into contact with the water and causes generation of hydrogen is used. This is because, generally, a chemical adsorbent is considered preferable as the adsorbent 13.

The chemical adsorbent adsorbs gas which is an adsorbate by a chemical adsorbing action. Therefore, for example, when various environmental factors which increase the temperature are generated, and the chemical adsorbent can be somehow influenced, the gas which is once adsorbed is also practically prevented from being discharged again. Therefore, in a case of handling combustible fuel or the like as a substance to be held, by some influence, when the chemical adsorbent adsorbs combustible gas, after this, there is not a case where the gas is discharged again due to the influence, such as an increase in temperature or the like. Therefore, it is possible to improve stability as the vacuum heat-insulating material 10.

In addition, compared to a physical adsorbent, the chemical adsorbent generally has a large gas absorbed amount per unit weight. Therefore, when comparing the physical adsorbent and the chemical adsorbent which can adsorb the same amount of gas, the chemical adsorbent also has an advantage that a volume that occupies the adsorbent 13 can be reduced on the inside of the vacuum heat-insulating material 10.

However, as described above, among the chemical adsorbents, there is a case where a material which comes into contact with the water and generates the chemical reaction that causes the hydrogen generation is used. In the related art, even when such a chemical adsorbing material (for convenience, referred to as "chemical adsorbing material which can generate hydrogen") is used as the adsorbent 13 of the vacuum heat-insulating material 10, a problem to be investigated in some manner was not generated since the material contributes to improving the stability of the vacuum heat-insulating material 10. However, in the dwelling wall 20 which is used under the environment where the exposure to the water of the liquid, such as rain water, is possible, it becomes necessary to consider correspondence if by any chance the outer cover material 11 of the vacuum heat-insulating material 10 is ruptured.

When the chemical adsorbing material which can generate hydrogen is in a tightly closed and held state on the inside of the vacuum heat-insulating material 10, a case of reaction to a large amount of water at the same time practically does not occur. Vapor exists on the inside of the vacuum heat-insulating material 10, and when the vapor is adsorbed by the chemical adsorbing material which can generate the hydrogen, the amount of hydrogen to be generated is also extremely small. Therefore, as the adsorbent 13, in addition to the chemical adsorbing material which can generate hydrogen, when a material which can adsorb the hydrogen is used together, it is possible to excellently adsorb the gas on the inside of the vacuum heat-insulating material 10 by the adsorbent 13.

Meanwhile, if by any chance the outer cover material 11 is ruptured, in the dwelling wall 20 which is used under the environment where the exposure to the water of the liquid, such as rain water, is possible, there is a possibility that the water which is the liquid enters the inside due to the rupture of the outer cover material 11. Here, when the chemical adsorbing material which can generate hydrogen is used as the adsorbent 13, on the inside of the vacuum heat-insulating material 10, since gas (including vapor) is chemically adsorbed for a long period of time, it is necessary to estimate a certain adsorbed amount in the adsorbent 13. Therefore, a weight of the chemical adsorbing material which is included in the adsorbent 13 and can generate hydrogen itself relatively increases. When the water of the liquid comes into contact with the adsorbent 13, the water and the chemical adsorbing material which can generate hydrogen rapidly react to each other, and by generating a large amount of hydrogen, in the worst case, there is also a possibility of ignition.

When the large amount of hydrogen is generated on the inside of the vacuum heat-insulating material 10, before the hydrogen is extracted from the rupture location of the outer cover material 11, the hydrogen is accumulated on the inside of the bag-like outer cover material 11, and there is a possibility that the vacuum heat-insulating material 10 expands. In addition, since the inside of the expanded vacuum heat-insulating material 10 is in a state of being filled with the hydrogen that is a combustible gas, in the worst case, there is also a possibility of ignition due to fire having a slight degree of spark. In the exemplary embodiment, since the dwelling wall 20 is used as a wall material of a house, from the viewpoint of preventing fire, a situation where the ignition of hydrogen should be avoided is achieved.

Here, in the exemplary embodiment, as the inner member of the vacuum heat-insulating material 10, and particularly, as the adsorbent 13, a material (a material which avoids or suppresses generation of hydrogen even when coming into contact with the water of the liquid) which does not practically cause hydrogen generation even when coming into contact with the water, is used. Accordingly, even when the outer cover material 11 is ruptured, it is possible to avoid generation of hydrogen on the inside of the vacuum heat-insulating material 10. Therefore, in a case where the vacuum heat-insulating material 10 used in the dwelling wall 20 is ruptured and the water of the liquid comes into contact with the inner member, it becomes possible to hold excellent stability of the dwelling wall 20.

A material which is used in the adsorbent 13 and does not practically generate hydrogen even when coming into contact with the water is not particularly limited, but for example, as an element material which forms the adsorbent 13, a material which satisfies at least one condition among (1) a material which does not chemically react to the water, (2) a material of which the hydrogen generation amount per 1 g is less than 80 mL when chemically reacting to the water, and (3) a material of which a standard electrode potential is equal to or greater than −2.0 V, may be used.

First, as (1) the material which does not chemically react to the water, a physical adsorbent can be employed. As a representative physical adsorbent, a material which is selected from zeolite, activated carbon, silica gel, diatom earth and the like, can be employed. Only one type of the physical adsorbents may be used, or two or more types may be used being selected and combined with each other.

In addition, since a material which does not chemically react to the water exists among the chemical adsorbents, the material which does not react to the water is not limited to the physical adsorbent. For example, since ZSM-5 type zeolite is a gas adsorbent (that is, the chemical adsorbent) having a chemical adsorbing action, but does not come into contact with the water and does not generate hydrogen, it is possible to appropriately use ZSM-5 type zeolite as a material that satisfies the above-described condition (1). In particular, when the ZSM-5 type zeolite is "copper ion exchange ZSM-5 type zeolite" which exchanges ion and leads copper ion, it is possible to improve adsorbing properties of not only the vapor but also nitrogen or the like. Therefore, as the adsorbent 13 which satisfies the above-described condition (1), the ZSM-5 type zeolite can be appropriately used.

Next, as (2) the material of which the hydrogen generation amount per 1 g is less than 80 mL when chemically reacting to the water, a material which is a material that chemically reacts to the water, or a material which is a material that can chemically react to the water according to the condition and which is a material of which the hydrogen generation amount per 1 g led out by a chemical reaction formula is less than 80 mL, may be employed. When the hydrogen generation amount per 1 g of the material is less than 80 mL, even when considering an internal volume or the like of the vacuum heat-insulating material 10, before the hydrogen is extracted from the rupture location, it can be determined that a state where the hydrogen is accumulated on the inside of the bag-like outer cover material 11 is practically avoided. Accordingly, it is possible to assume that the hydrogen generation is not caused even in a case where the material comes into contact with the moisture.

Here, the element material in the exemplary embodiment indicates the element itself when an element component included in the adsorbent is specified. For example, generally, there is a case where alloy is used as the adsorbent, but since the bond between the elements is weak in a case of metal bond of alloy, the chemical reaction to the water is easily performed. Accordingly, the material made of the metal bond is not the alloy, but as the element material, a condition is determined by the hydrogen generation amount when the hydrogen generation amount per 1 g is measured. Therefore, in other words, the above-described condition (2) in the exemplary embodiment can be a condition that the hydrogen generation amount per 1 g of element material which configures the adsorbent 13 is less than 80 mL.

In addition, as (3) the material of which a standard electrode potential is equal to or greater than −2.0 V, a material of which an electrode potential which is an electrode potential in a standard state in an electric chemical reaction, that is, an electrode potential when a standard hydrogen electrode is a reference (±0 V) is equal to or greater than −2.0 V, may be employed. In a case of a material of which the standard electrode potential is equal to or greater than −2.0 V, under the condition of the normal temperature, it is determined that the chemical reaction to the water rarely occurs, and thus, the material becomes a material which does not cause the hydrogen generation even in a case of coming into contact with the moisture.

As a material which can chemically react to the water, typically, a metal material having a large ionization tendency. Since the standard electrode potential is high and the hydrogen generation amount per 1 g is equal to or greater than 80 mL in the metal material having a large ionization tendency, the metal material is excluded from the material exemplified in the above-described (2) and (3).

In the exemplary embodiment, as the metal material which is reliably excluded from the material which does not cause the hydrogen generation even when coming into contact with the water, a metal element of the group 1 in the periodic table (alkali metal) and a metal element of the group 2 in the periodic table excluding Be (Mg and alkaline earth metal) are employed. The metal elements chemically react to the water under the condition of the normal temperature, and can generate hydrogen. Standard electrode potentials of Li, Cs, Rb, K, Ba, Sr, Ca, Na, and Mg (for convenience, referred to as a first metal element group) which can be generally used as elements of the group 1 and the group 2 in the periodic table increase in the description order (that is, in the metal element group, the standard electrode potential of Li is the lowest, and the standard electrode potential of Mg is the highest). Since any of the standard electrode potentials of the metal elements is equal to or less than −2.35 V, the standard electrode potentials are excluded from the above-described condition (3).

In other words, a substance of which the standard electrode potential is relatively low other than Li, Cs, and Rb is preferable.

In addition, when any of the metal element of the group 1 in the periodic table and the metal element of the group 2 in the periodic table reacts to the water, hydrogen of which the amount per 1 g is equal to or greater than 80 mL is generated (in Cs having the lowest hydrogen generation amount, hydrogen of which the amount per 1 g is equal to or greater than 84 mL is generated). Therefore, the metal elements are also excluded from the above-described condition (2).

In addition, the metal material generally does not cause hydrogen generation even when coming into contact with the water, but under a chemically active condition, a metal material which generates a chemical reaction that causes hydrogen generation also exists. The metal materials can be generally used in the adsorbent 13 as a material which satisfies the above-described conditions (2) and (3). For example, standard electrode potentials of Be, Al, Zr, Mn, Ta, Zn, Cr, Fe, Cd, Co, and Ni (for convenience, referred to as a second metal element group) increases in the description order (that is, in the second metal element group, the standard electrode potential of Be is the lowest, and the standard electrode potential of Ni is the highest). Any standard electrode potential of the second metal element group is equal to or greater than −2.0 V (for example, the lowest standard electrode potential of Be is −1.9 V). Therefore, since the metal material included in the second metal element group corresponds to the above-described condition (3), the metal material can be appropriately used as the adsorbent 13.

However, when the metal materials of the above-described second metal element group become chemically active to a degree of being capable of reacting to the water, any hydrogen generation amount per 1 g exceeds 80 mL (for example, in Cd of which the hydrogen generation amount is the lowest, the hydrogen generation amount per 1 g is 200 mL). In a case where there is a possibility that the adsorbent 13 becomes chemically active when the outer cover material 11 is ruptured due to a use condition of the dwelling wall 20 or the like, a material which corresponds to the above-described condition (3) and is excluded from the condition (2), can also be excluded as a material of the adsorbent 13. In other words, since the metal material of the second metal element group satisfies the above-described condition (2), basically, the metal material can be appropriately used as the adsorbent 13, but according to the use condition of the dwelling wall 20, there is a case where the metal material is not used as the adsorbent 13.

In addition, in the second metal element group, the standard potential of Ni is the highest (−0.257 V), but in a case of a material having a standard electrode potential that exceeds the standard potential of Ni, it is determined that the material practically does not chemically react to the water even under the chemically active condition. Therefore, in the above-described condition (3), it is more preferable that the standard electrode potential of the material is equal to or greater than −0.26 V. Examples of the metal material include Sn, Pb, Sb, Bi, Cu, Hg, Ag, Pd, Ir, Pt, and Au.

Since standard electrode potentials of the metal element groups (for convenience, referred to as a third metal element group) increase in the description order, in the third metal element group, the standard electrode potential of Sn is the lowest (−0.1315 V). In addition, since the standard electrode potentials of Sn and Pb are lower than the standard hydrogen electrode (±0 V) (the standard electrode potential of Pb is −0.1263 V), theoretically, there is a possibility that hydrogen is generated by the chemical reaction to the water. However, when the standard electrode potential is equal to or greater than −0.26 V, since a difference between the standard electrode potential and the potential of a standard hydrogen electrode is sufficiently small even in a chemically active state, it is determined that the material practically does not react to the water. Therefore, the third metal element group can be a material which satisfies the above-described condition (3) and the condition (1) at the same time.

In addition, in the description above, as an example of the material which satisfies the conditions (1) to (3), the metal element is illustrated, but it is needless to say that the present invention is not limited thereto, and a compound of the metal element or a compound (organic compound) of a non-metal element may be employed as long as the material satisfies at least one of the conditions (1) to (3).

Here, a use state of the material used as the adsorbent 13 is not particularly limited, and various known states, such as a shape of particles (shape of powder), a shape of a block (shape of a tablet), and a shape of a sheet, can be employed. In particular, in a case of the shape of particles, since the adsorbed amount increases when the surface area increases similar to a porous body, and this is preferable, at least one of four conditions that (i) 80% by volume or more of particles of which a particle diameter is within a range of 0.01 to 1400 μm are included, (ii) an average particle diameter is within a range of 0.01 to 1400 μm, (iii) density is within a range of 0.2 to 1.4 g/mL, and (iv) a specific surface area is within a range of 200 to 2000 m$^2$/g, may be satisfied. In addition, it is preferable to satisfy all of the conditions.

Here, regarding the density, in a case where the adsorbent is a solid type, a case where the density of the adsorbent is within the above-described range becomes a condition. In addition, in a case where the adsorbent is powder, a condition that bulk density is within a predetermined range is achieved. The bulk density is a value obtained by dividing a mass of the powder by the volume including the space between the particles by filling the container having a known volume with the powder. As an example of the measuring method, it is possible to acquire the value by dividing the filled adsorbent mass by 100 by providing a funnel in an opening portion of a measuring cylinder having a capacity of 500 ml and by filling the inside with 100 ml of adsorbent from above. In the exemplary embodiment, after filling the inside with the adsorbent, tapping is performed 20 times, and a value obtained by dividing the adsorbent mass by the volume after the tapping is also considered as the bulk density.

In addition, the specific surface area can be calculated from the amount obtained by adsorbing molecule ascertained from an adsorption occupied area on the surface of powder particles and by measuring an adsorption and desorption isothermal curve by a constant volume method. In general, the specific surface area is measured by adsorbing liquid nitrogen by a commercial BET specific surface area measuring apparatus which uses the above-described principle.

In particular, in a case where the physical adsorbent is used as the adsorbent 13, and generally, since the adsorbed amount of the adsorption amount per unit weight of the physical adsorbent is smaller than that of the chemical adsorbent, and from the viewpoint of improving the adsorption function, at least one condition among the above-described four conditions may be satisfied. In addition, it is preferable to satisfy all of the above-described conditions (i) to (iv). In addition, even in a case where the chemical adsorbent is used as the adsorbent 13, when the chemical adsorbent has a shape of particles, at least one condition among the above-described four conditions. In addition, it is preferable to satisfy all of the above-described conditions (i) to (iv). In addition, even in a case where the physical adsorbent and the chemical adsorbent are used together as the adsorbent 13, when the shape of particles is used, at least one condition among the above-described four conditions may be satisfied. In addition, similarly, it is preferable to satisfy all of the conditions (i) to (iv).

Among the above-described conditions, the condition (i), that is, a condition that a range of 80% by volume or more of particles in all of the particles is within a range of 0.01 to 60 μm, is more preferable. In addition, the condition (ii), that is, a condition that the average particle diameter is within a range of 0.01 to 20 μm, is more preferable. In addition, the condition (iv), that is, a condition that the specific surface area is within a range of 200 to 800 m$^2$/g, is more preferable. Accordingly, even in a case where at least the physical adsorbent is used as the adsorbent 13, it is possible to achieve excellent adsorption performance.

In addition, in a case where the material used as the adsorbent 13 is in a shape of a block or in a shape of a sheet, it is preferable that the shape of the adsorbent 13 is processed to have (I) a shape of which a thickness T2 (unit: mm) which is equal to or less than 60% of a thickness T1 (unit: mm) of the vacuum heat-insulating material 10 (refer to FIG. 2), or (II) a shape of which a ratio of a sectional area CS (unit: mm$^2$) of a surface vertical to the thickness T2 (unit: mm) in the thickness direction is within a range of T2:CS=1:100 to 1:250. It is needless to say that both of the conditions (I) and (II) may be satisfied.

The above-described condition (I), that is, the condition that the thickness T2 of the adsorbent 13 is equal to or less than 60% of the thickness T1 of the vacuum heat-insulating material 10 is satisfied, it is possible to suppress heat transfer via the adsorbent 13 in the thickness direction of the vacuum heat-insulating material 10. In addition, the condition (II), that is, the condition that thickness T2 of the adsorbent 13:sectional area CS=1:100 to 1:250 is satisfied, it is possible to suppress the heat transfer via the adsorbent 13 in the thickness direction of the vacuum heat-insulating material 10, to realize excellent adsorption performance on the inside of the vacuum heat-insulating material 10, and further, also to achieve excellent shape holding properties of the adsorbent 13.

In addition, regarding the above-described condition (I), when the thickness T2 of the adsorbent 13 exceeds 60% of the thickness T1 of the vacuum heat-insulating material 10, the heat transfer via the adsorbent 13 becomes larger in the thickness direction of the vacuum heat-insulating material 10. In addition, from the viewpoint of more efficiently suppressing the heat transfer via the adsorbent 13, it is more preferable that the thickness T2 of the adsorbent 13 is equal to or less than 50% of the thickness T1 of the vacuum heat-insulating material 10.

Furthermore, regarding the above-described condition (I), when the thickness T2 of the adsorbent 13 exceeds 30% and is equal to or less than 60% of the thickness T1 of the vacuum heat-insulating material 10, it is preferable that upper and lower surfaces in the thickness direction are layered or covered by the heat-insulating member. For example, it is possible to cover both of the upper and lower surfaces of the adsorbent 13 with the inorganic fiber which is similar to the core material 12 or non-woven fabric of the inorganic fiber (for example, glass cloth). In addition, it is possible to cover both of the upper and lower surfaces of the adsorbent 13 with a material having a high heat transfer properties. For example, by layering a carbon sheet on both of the upper and lower surfaces of the adsorbent 13, since the heat transferred to the adsorbent 13 escapes to the core material 12 in the vicinity by the carbon sheet, as a result, it is possible to improve heat-insulating properties of the adsorbent 13.

In addition, regarding the above-described condition (II), when the ratio of the sectional area CS with respect to the thickness T2 of the adsorbent 13 is lower than the above-described lower limit (T2:CS=1:100), the adsorbent 13 becomes relatively thick, and there is a possibility that it is not possible to efficiently suppress the heat transfer via the adsorbent 13. In addition, when the ratio of the sectional area CS with respect to the thickness T2 of the adsorbent 13 exceeds the above-described upper limit (T2:CS=1:250), the adsorbent 13 becomes relatively thin, and there is a possibility that the time (inner portion reaching time) until the adsorption material (gas) reaches the inside from the outer surface of the adsorbent 13 is two short, and the adsorbent 13 cannot sufficiently adsorb the adsorption material. In addition, as the adsorbent 13 becomes relatively thin, damage, such as cracking or chipping, is likely to be generated, and there is also a possibility that the shape holding properties deteriorate.

In addition, in the exemplary embodiment, both of the units of the thickness T1 of the vacuum heat-insulating material 10 and the thickness T2 of the adsorbent 13 are (mm), and the unit of the sectional area CS of the adsorbent 13 is ($mm^2$), but when the ratio of the thickness or the ratio between the thickness and the sectional area is calculated, the type of the unit is not particularly limited as long as the above-described range (I) or (II) is satisfied.

By using the adsorbent 13 according to the exemplary embodiment, it is possible to maintain the degree of vacuum (decompressed state) of the inside of the vacuum heat-insulating material 10, and to suppress a possibility that the core material deteriorates due to vapor or the like. In particular, since the adsorption by the chemical adsorbent is stronger than that of the physical adsorption and is generally irreversible adsorption, the moisture which is once adsorbed is rarely desorbed. Therefore, it is possible to appropriately use the chemical adsorbent as the adsorbent 13 of the vacuum heat-insulating material 10.

In this manner, according to the exemplary embodiment, in the dwelling wall having a configuration in which the vacuum heat-insulating material is disposed on the rear surface side of the wall material, as the inner member of the vacuum heat-insulating material, a material which does not cause hydrogen generation in a case of coming into contact with the moisture when the outer cover material is ruptured and the water of the liquid enters the inside. Accordingly, if by any chance the outer cover material is ruptured and the water which is the liquid enters the inside of the vacuum heat-insulating material, it is possible to avoid generation of hydrogen on the inside of the vacuum heat-insulating material. Therefore, even in a case where the vacuum heat-insulating material used in the dwelling wall is ruptured and the water of the liquid comes into contact with the inner member, it is possible to realize excellent stability of the dwelling wall.

In addition, the present invention is not limited to the above-described exemplary embodiment, various changes are possible within a range illustrated in the range of claims, and the exemplary embodiment in which technical methods disclosed in each of the various exemplary embodiments and a plurality of modification examples can be appropriately combined is included in a technical range of the present invention.

As described above, a dwelling wall according to a first aspect of the present invention includes a vacuum heat-insulating material including an outer cover material, and an inner member which is sealed in a tightly closed and decompressed state on the inside of the outer cover material; and a wall material. In addition, the vacuum heat-insulating material is disposed on a rear surface side of the wall material, and the inner member is configured of a material which does not generate hydrogen in a case of coming into contact with moisture of liquid.

According to the configuration, since the inner member is a member which practically does not generate the hydrogen in a case of coming into contact with the moisture of the liquid, if by any chance the outer cover material is ruptured and the water which is the liquid enters the inside of the vacuum heat-insulating material, it is possible to avoid generation of hydrogen on the inside of the vacuum heat-insulating material. Therefore, even in a case where the vacuum heat-insulating material used in the dwelling wall is ruptured and the water of the liquid comes into contact with the inner member, it is possible to realize excellent stability of the dwelling wall.

When the adsorbent which is the inner member is the chemical adsorbent, when the chemical adsorbent adsorption-reacts to the water of the liquid, it is assumed that more intense chemical reaction occurs than that of the adsorption-reaction between the gas and the moisture (that is, vapor). Meanwhile, according to the above-described configuration, since it is possible to avoid generation of hydrogen on the inside of the vacuum heat-insulating material, it is possible to realize excellent stability of the dwelling wall.

In addition, according to a second aspect, in the heat-insulating container according to the first aspect, the inner member included in the vacuum heat-insulating material may include a core material having heat-insulating properties, and an adsorbent which is capable of adsorbing gas on the inside of the outer cover material.

According to the configuration, since the core material and the adsorbent which are inner members are configured of a material which does not cause hydrogen generation in a case of coming into contact with the moisture, even in a case where the vacuum heat-insulating material is ruptured and the water of the liquid comes into contact with the inner member, it is possible to realize excellent stability of the dwelling wall.

In addition, according to a third aspect, in the second aspect, at least one of materials among a material which does not chemically react to water, a material of which a hydrogen generation amount per 1 g is less than 80 mL when chemically reacting to the water, and a material of which a standard electrode potential is equal to or greater than −2.0 V, may be configured to be used as an element material which forms the adsorbent.

According to the configuration, in a case of a material which satisfies any of the above-described conditions, practically, since the material can be considered as a material which does not cause hydrogen generation in a case of coming into contact with the moisture, even in a case where the vacuum heat-insulating material is ruptured and the water of the liquid comes into contact with the inner member, it is possible to realize excellent stability of the dwelling wall.

In addition, according to a fourth aspect, in the second aspect or the third aspect, at least any one condition among (1) a condition that the adsorbent has a shape of particles and particles having a particle diameter which is within a range of 0.01 to 1400 μm are 80% by volume or more, (2) a condition that the adsorbent has a shape of particles of which an average particle diameter is within a range of 0.01 to 1400 μm, (3) a condition that the adsorbent has a shape of particles of which density is within a range of 0.2 to 1.4 g/mL, and (4) a condition that the adsorbent has a shape of particles of which a specific surface area is within a range of 200 to 2000 $m^2/g$, may be satisfied.

According to the configuration, since the adsorbent satisfies the above-described conditions, it is possible not only not to generate the hydrogen generation in a case of coming into contact with the moisture, but also to realize excellent adsorption performance.

In addition, according to a fifth aspect, in any of the second aspect to the fourth aspect, the adsorbent may be processed to have a shape having a thickness which is equal to or less than 60% of a thickness of the vacuum heat-insulating material, or a shape of which a ratio (for example, unit: $mm^2$) of a sectional area with respect to the thickness (for example, unit: mm) is within a range of 1:100 to 1:250.

According to the configuration, since the adsorbent satisfies the above-described conditions, it is possible not only not to generate the hydrogen generation in a case of coming into contact with the moisture, but also to suppress generation of heat transfer via the adsorbent and to avoid deterioration of heat-insulation.

In addition, according to a sixth aspect, in the fifth aspect, a heat-insulating member may be layered on or covers upper and lower surfaces in the thickness direction of the vacuum heat-insulating material, in the adsorbent.

According to the configuration, since the adsorbent is covered with the heat-insulating member, it is possible to suppress generation of heat transfer via the adsorbent, and to avoid a concern abound deterioration of heat-insulation.

In addition, according to a seventh aspect, in any of the second aspect to the sixth aspect, the core material may be configured of an inorganic fiber or a thermosetting foam body.

According to the configuration, since a material which does not cause hydrogen generation in a case where the core material practically comes into contact with the moisture, even in a case where the vacuum heat-insulating material is ruptured and the water of the liquid comes into contact with the inner member, it is possible to avoid or suppress influence on the stored low-temperature substance.

In addition, according to an eighth aspect, in any of the first aspect to the seventh aspect, the vacuum heat-insulating material may be fixed to a rear surface of the wall material, and may be configured in a shape of a heat-insulating panel material.

According to the configuration, since the dwelling wall is configured as a heat-insulating panel material including the vacuum heat-insulating material, it is possible to provide a dwelling wall having not only excellent heat-insulation and stability but also excellent operability.

In addition, according to a ninth aspect, a vacuum heat-insulating material which is used in a dwelling wall is also included. In other words, a vacuum heat-insulating material which is used in a dwelling wall provided with a wall material and is disposed on a rear surface side of the wall material includes: an outer cover material; and an inner member which is sealed in a tightly closed and decompressed state on the inside of the outer cover material. In addition, the inner member is configured of a material which does not generate hydrogen in a case of coming into contact with the moisture of the liquid.

INDUSTRIAL APPLICABILITY

As described above, according to the present invention, even in a case where the vacuum heat-insulating material used in the dwelling wall is ruptured and the water of the liquid comes into contact with the inner member, it is possible to achieve a special effect that excellent stability of the dwelling wall is realized. Accordingly, the present invention can be can be widely and appropriately employed in fields where heat-insulation is required, such as a dwelling wall provided with a vacuum heat-insulating material and a vacuum heat-insulating material used in the dwelling wall, and is efficient.

REFERENCE MARKS IN THE DRAWINGS

10 VACUUM HEAT-INSULATING MATERIAL
11 OUTER COVER MATERIAL (OUTER PACKAGE MATERIAL)
12 CORE MATERIAL
13 ADSORBENT
20 DWELLING WALL
21 WALL MATERIAL
21A FRONT SURFACE
21B REAR SURFACE
22 FRAME BODY
23 NAIL MEMBER
24, 25 AIRTIGHT MATERIAL
26 CALKING MATERIAL

The invention claimed is:
1. A dwelling wall comprising:
a vacuum heat-insulating material including an outer cover material, and an inner member which is sealed in a tightly closed and decompressed state on an inside of the outer cover material; and
a wall material,
wherein the vacuum heat-insulating material is disposed on a rear surface side of the wall material, and
wherein the inner member comprises a chemical adsorbent for adsorbing gases including vapor, the inner member being configured of a material which does not generate hydrogen in a case of coming into contact with moisture of liquid, wherein the adsorbent is processed to have a shape of which a ratio of a sectional area (CS) with respect to a thickness (T2) is within a range of T2:CS=1:100 to 1:250.

2. The dwelling wall according to claim 1, wherein the inner member included in the vacuum heat-insulating material includes a core material having heat-insulating properties and an adsorbent which is capable of adsorbing gas on the inside of the outer cover material.

3. The dwelling wall according to claim 2, wherein at least one of materials among a material which does not chemically react to water, a material of which a hydrogen generation amount per 1 g is less than 80 mL when chemically reacting to the water, and a material of which a standard electrode potential is equal to or greater than −2.0 V, is used as an element material which forms the adsorbent.

4. The dwelling wall according to claim 2, wherein at least any one condition among (1) a condition that the adsorbent has a shape of particles and particles having a particle diameter which is within a range of 0.01 to 1400 m are 80% by volume or more, (2) a condition that the adsorbent has a shape of particles of which an average particle diameter is within a range of 0.01 to 1400 m, (3) a condition that the adsorbent has a shape of particles of which density is within a range of 0.2 to 1.4 g/mL, and (4) a condition that the adsorbent has a shape of particles of which a specific surface area is within a range of 200 to 2000 $m^2/g$, is satisfied.

5. The dwelling wall according to claim 2, wherein the adsorbent is processed to have a shape having a thickness which is equal to or less than 60% of a thickness of the vacuum heat-insulating material.

6. The dwelling wall according to 5, wherein a heat-insulating member is layered on or covers upper and lower surfaces in a thickness direction of the vacuum heat-insulating material, in the adsorbent.

7. The dwelling wall according to claim 2, wherein the core material is configured of an inorganic fiber or a thermosetting foam body.

8. The dwelling wall according to claim 1, wherein the vacuum heat-insulating material is fixed to a rear surface of the wall material, and is configured in a shape of a heat-insulating panel material.

9. A vacuum heat-insulating material which is used in a dwelling wall provided with a wall material and is disposed on a rear surface side of the wall material, comprising:

an outer cover material; and an inner member which is sealed in a tightly closed and decompressed state on an inside of the outer cover material, wherein the inner member comprises a chemical adsorbent for adsorbing gases including vapor, the inner member being configured of a material which does not generate hydrogen in a case of coming into contact with moisture of liquid, wherein the adsorbent is processed to have a shape of which a ratio of a sectional area (CS) with respect to a thickness (T2) is within a range of T2:CS=1:100 to 1:250.

* * * * *